US 8,869,653 B2

(12) United States Patent
Fujita et al.

(10) Patent No.: US 8,869,653 B2
(45) Date of Patent: Oct. 28, 2014

(54) DRIVE APPARATUS FOR HYBRID VEHICLE

(75) Inventors: Yasuhiro Fujita, Saitama (JP); Toru Takahashi, Saitama (JP); Tatsuya Noda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/818,280

(22) PCT Filed: Oct. 5, 2011

(86) PCT No.: PCT/JP2011/072987
§ 371 (c)(1),
(2), (4) Date: Feb. 21, 2013

(87) PCT Pub. No.: WO2012/053361
PCT Pub. Date: Apr. 26, 2012

(65) Prior Publication Data
US 2013/0192417 A1   Aug. 1, 2013

(30) Foreign Application Priority Data
Oct. 21, 2010  (JP) .................................. 2010-236813

(51) Int. Cl.
| | |
|---|---|
| *F16H 37/06* | (2006.01) |
| *F16H 3/08* | (2006.01) |
| *B60K 6/387* | (2007.10) |
| *B60K 6/26* | (2007.10) |
| *B60L 11/14* | (2006.01) |
| *B60L 11/12* | (2006.01) |
| *B60K 6/442* | (2007.10) |
| *F16D 7/02* | (2006.01) |

(52) U.S. Cl.
CPC ........... *F16H 37/065* (2013.01); *Y02T 10/7241* (2013.01); *B60K 6/387* (2013.01); *B60K 6/26* (2013.01); *B60L 11/14* (2013.01); *Y02T 10/6234* (2013.01); *B60L 2210/40* (2013.01); *B60L 2210/30* (2013.01); *B60L 11/123* (2013.01); *Y02T 10/70* (2013.01); *Y02T 10/6217* (2013.01); *B60Y 2300/67* (2013.01); *B60Y 2304/01* (2013.01); *Y02T 10/7077* (2013.01); *B60W 2710/083* (2013.01); *Y10S 903/902* (2013.01); *B60K 6/442* (2013.01); *F16D 7/027* (2013.01)
USPC ............................. 74/730.1; 74/331; 903/902

(58) Field of Classification Search
CPC ......... F16H 47/06; F16H 47/02; F16H 45/02; B60K 17/105; B60K 17/28
USPC ........................ 74/661, 730.1, 330, 331, 340; 180/65.23, 65.22, 65.25; 475/5; 477/5, 477/6, 8
See application file for complete search history.

(56) References Cited

U.S. PATENT DOCUMENTS

| | | | | |
|---|---|---|---|---|
| 6,455,947 | B1 * | 9/2002 | Lilley et al. | ................. 290/40 C |
| 8,262,524 | B2 * | 9/2012 | Rask et al. | ........................ 475/5 |

(Continued)

FOREIGN PATENT DOCUMENTS

| | | |
|---|---|---|
| JP | 2002-013547 A | 1/2002 |
| JP | 2009-062022 A | 3/2009 |
| JP | 2010-162969 A | 7/2010 |
| WO | WO 2009/128288 A1 | 10/2009 |

*Primary Examiner* — Troy Chambers
*Assistant Examiner* — Jude Agendia
(74) *Attorney, Agent, or Firm* — Westerman, Hattori, Daniels & Adrian, LLP

(57) ABSTRACT

Provided is a drive apparatus of a hybrid vehicle, configured in such a manner that the occurrence of a resonance phenomenon is minimized and that the efficiency of utilization of the space occupied by a torque limiter mechanism is improved. A drive apparatus for a hybrid vehicle is configured in such a manner that a torque limiter is provided in the path of power transmission between an inner shaft and a generator at a position between the generator and a motor. The torque limiter axially overlaps with at least a part of the stator of the generator and/or at least a part of the stator of the motor.

3 Claims, 7 Drawing Sheets

(56) References Cited

U.S. PATENT DOCUMENTS

| | | |
|---|---|---|
| 8,272,462 B2 * | 9/2012 | Yoshida et al. .............. 180/65.1 |
| 8,430,190 B2 * | 4/2013 | Honda et al. ................ 180/65.25 |
| 2007/0007059 A1 * | 1/2007 | Nomura et al. .............. 180/65.2 |
| 2010/0179010 A1 | 7/2010 | Kuzuya et al. |
| 2011/0036652 A1 | 2/2011 | Honda et al. |
| 2012/0035014 A1 * | 2/2012 | Moeller ............................ 475/5 |
| 2013/0288854 A1 * | 10/2013 | Kobayashi ........................ 477/5 |
| 2013/0345019 A1 * | 12/2013 | Kaltenbach et al. .............. 477/5 |

* cited by examiner

DRIVE APPARATUS FOR HYBRID VEHICLE

CROSS-REFERENCE TO RELATED APPLICATION

This application is a National Stage entry of International Application No. PCT/JP2011/072987 filed Oct. 5, 2011, which claims priority to Japanese Patent Application No. 2010-236813 filed Oct. 21, 2010, the disclosure of the prior applications are hereby incorporated in their entirety by reference.

TECHNICAL FIELD

The present invention relates to a drive apparatus of a hybrid vehicle, and more particularly to a drive apparatus of a hybrid vehicle including an engine, a motor and a generator.

BACKGROUND ART

As a drive apparatus of a hybrid vehicle including an engine, a motor and a generator, an apparatus disclosed, for example, in Patent Document 1 is known. As shown in FIG. 6, the drive apparatus of the hybrid vehicle 100 includes an engine 50, an engine shaft 1 connected to the engine 50 via a crankshaft 51, a motor-generator shaft 2 including an inner shaft 2a connected to the engine shaft 1 via a generator driving gear train 10 and a hollow outer shaft 2b for a motor disposed around the inner shaft 2a, a generator 60 connected to the inner shaft 2a, a motor 70 juxtaposed with the generator 60 and connected to the outer shaft 2b for the motor, an output shaft 3 connected to the outer shaft 2b for the motor via a motor power transmission gear train 20 and disposed parallel to the engine shaft 1 and the motor-generator shaft 2, and a differential device 45 connected to the output shaft 3 via a final gear train 40 and configured to transmit power to driving wheels 47, 47 via a differential shaft 46.

The engine shaft 1 is provided with a clutch 80 to allow or prohibit power transmission between the engine shaft 1 and the output shaft 3 via an engine power transmission gear train 30. As the clutch 80 is opened, a so-called series-drive becomes possible in which the power transmission between the engine shaft 1 and the output shaft 3 is prohibited, the generator 60 generates electricity by the power of the engine 50 and the power obtained by the electricity generation is supplied to the motor 70. Further, as the clutch 80 is engaged, a so-called parallel-drive becomes possible in which the power transmission between the engine shaft 1 and the output shaft 3 is allowed, the power of the engine 50 is transmitted to the output shaft 3 and the power of the motor 70 is transmitted to the output shaft 3.

By the way, in the drive apparatus of the hybrid vehicle disclosed in Patent Document 1 using the generator 60 in order to start the engine 50, there is a problem that the torsional natural vibration frequency of the apparatus itself and the engine torque fluctuation frequency are matched and thus resonance phenomenon occurs when the engine is started and thus excessive torque is applied to the motor-generator shaft 2 or the like. In order to prevent distortion or breakage of the motor-generator shaft 2 or the like due to the resonance phenomenon, there was a need to strengthen the shaft itself.

Meanwhile, in a drive apparatus of a hybrid vehicle disclosed in Patent Document 2 including an engine and a motor, as shown in FIG. 7, a torque limiter mechanism 235 is provided in a damper 230 included in an output shaft 211 of the engine and the power transmission is shut-off by the torque limiter mechanism when the fluctuation torque by the engine and the motor reaches a predetermined value.

Accordingly, in the drive apparatus of the hybrid vehicle disclosed in Patent Document 1, it is also considered that the torque limiter mechanism is provided in the damper included in the output shaft (crankshaft) of the engine in order to prevent the distortion or breakage of the motor-generator shaft 2 or the like due to the resonance phenomenon.

PRIOR ART DOCUMENT

Patent Documents

Patent Document 1: WO 2009/128288
Patent Document 2: JP-A-2002-013547

However, the drive apparatus of the hybrid vehicle disclosed in Patent Document 1 has a problem that it is necessary to increase the size and capacity of the torque limiter mechanism when the torque limiter mechanism is provided in the damper included in the output shaft of the engine and therefore a large space for installation is required.

SUMMARY OF INVENTION

One or more embodiments provide a drive apparatus of a hybrid vehicle capable of suppressing the occurrence of the resonance phenomenon and also improving the space efficiency of the torque limiter mechanism.

DESCRIPTION OF EMBODIMENTS

Figure 6:
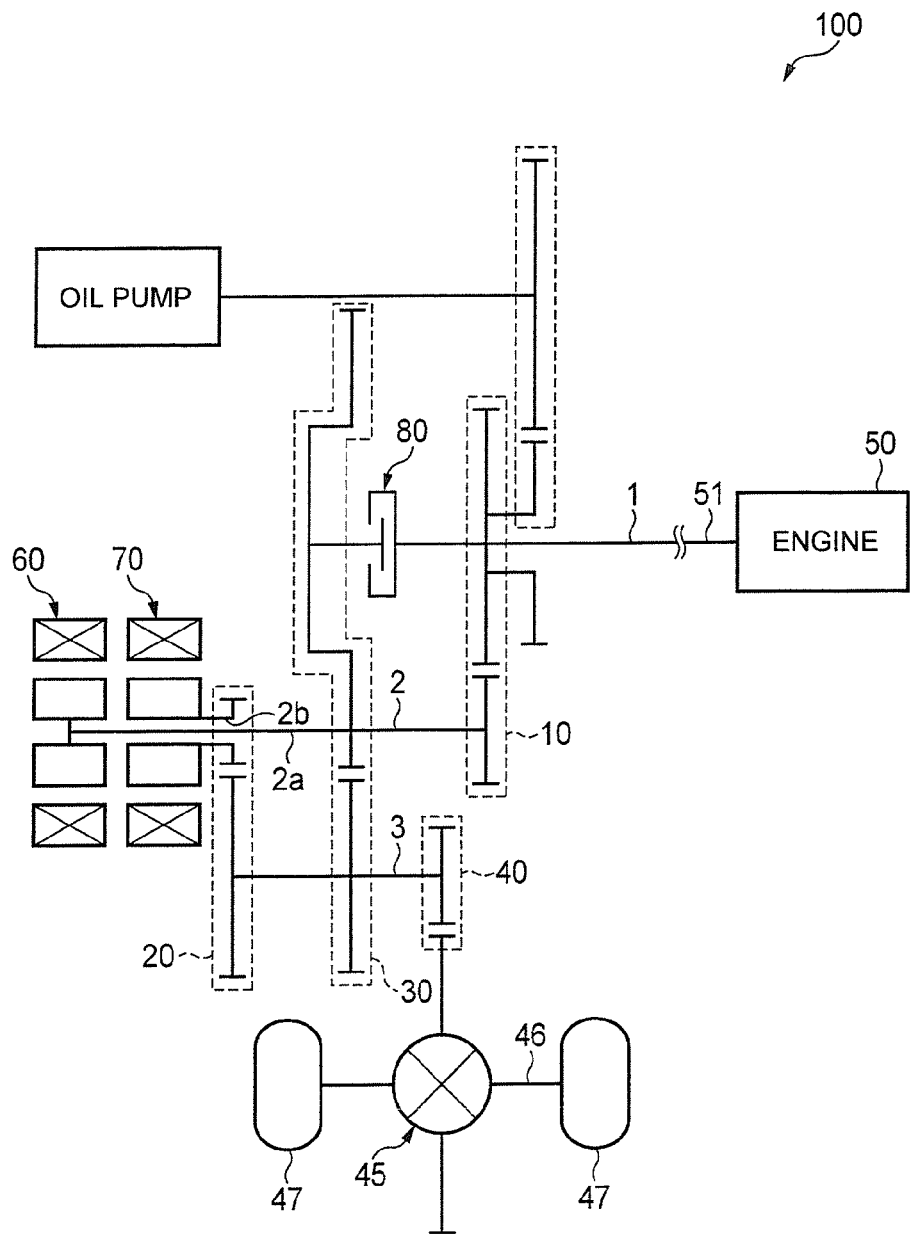
FIG. 6 is a skeleton diagram of a drive apparatus of a hybrid vehicle disclosed in Patent Document 1.
Figure 7:
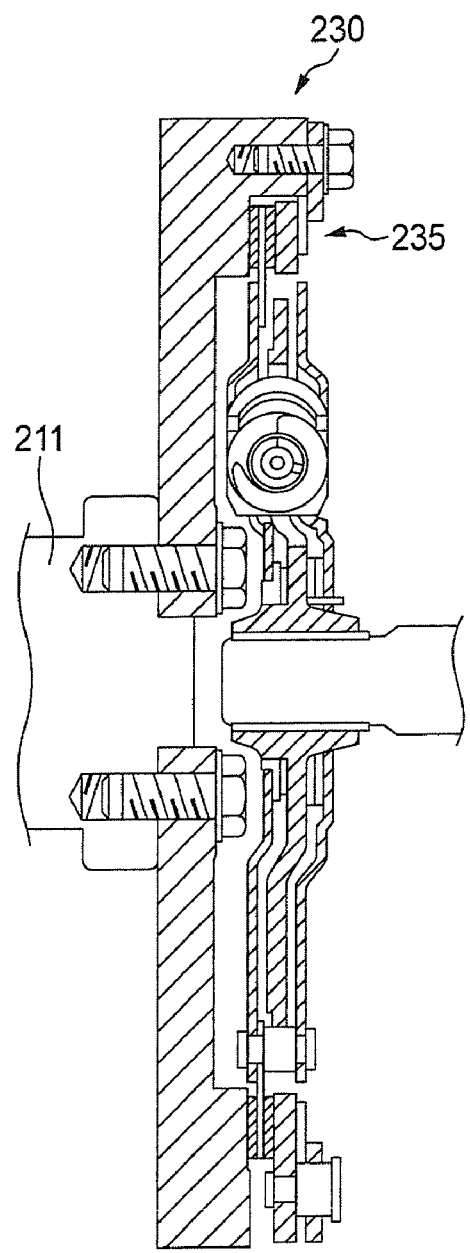
FIG. 7 is a sectional view of a damper of a drive apparatus of a hybrid vehicle disclosed in Patent Document 2.

Hereinafter, a drive apparatus of a hybrid vehicle according to an exemplary embodiment of the present invention will be described in detail with reference to the drawings. The same or similar element will be denoted by the same reference numeral as that of the drive apparatus of the hybrid vehicle shown in FIG. 6.

Figure 1:
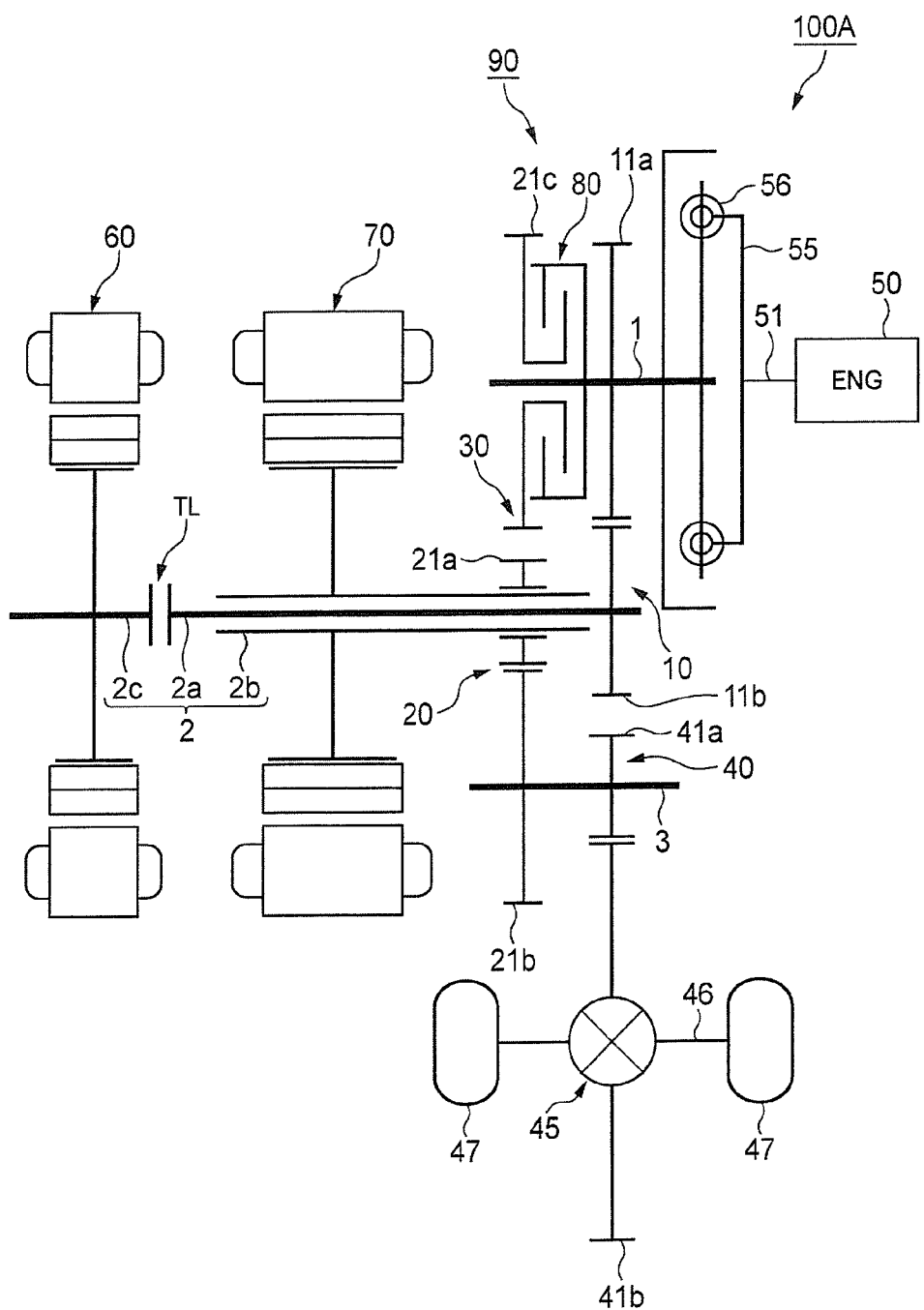
FIG. 1 is a skeleton diagram of a drive apparatus of a hybrid vehicle according to an exemplary embodiment of the present invention.
Figure 2:
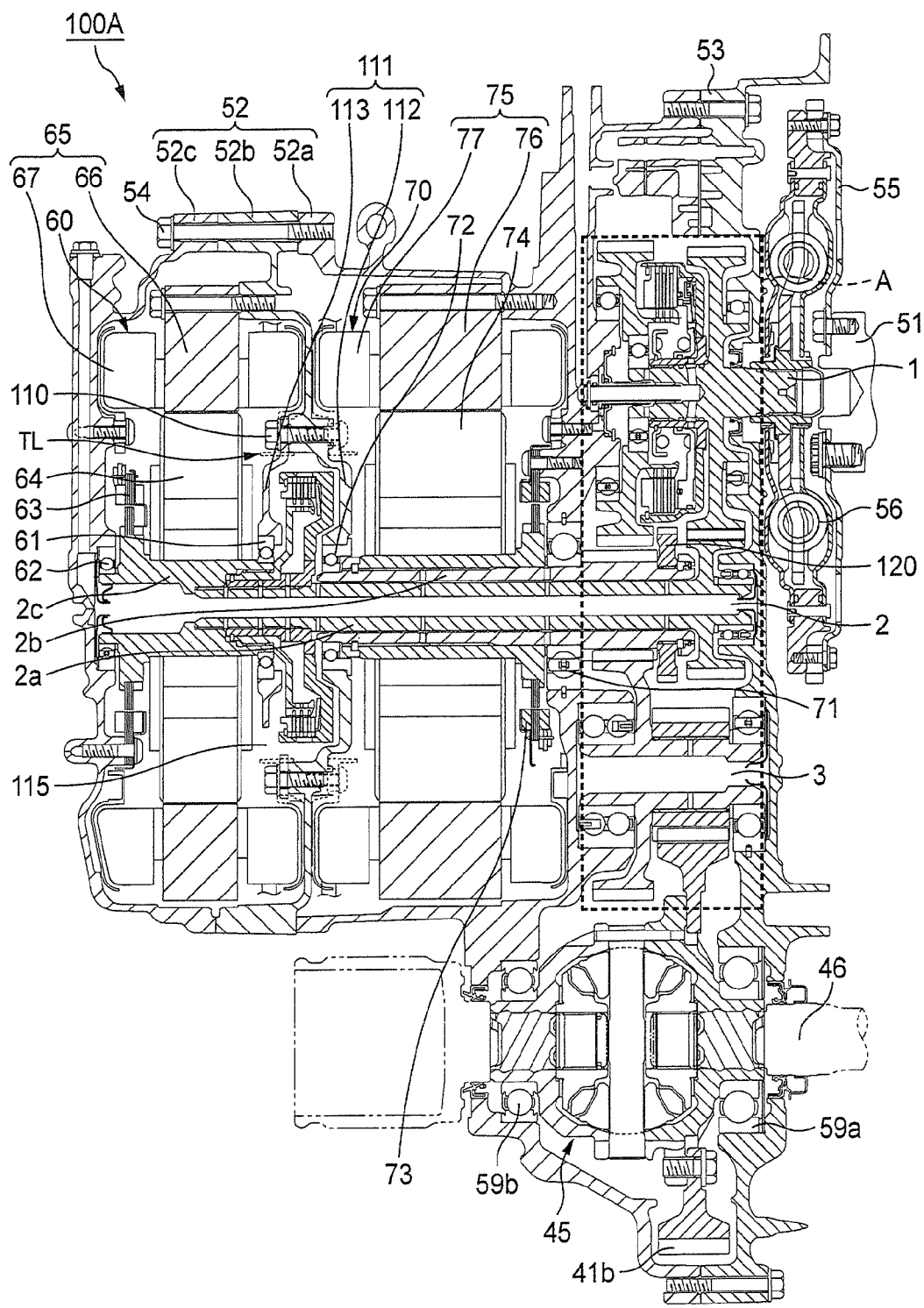
FIG. 2 is a sectional view of the drive apparatus of the hybrid vehicle according to the exemplary embodiment of the present invention.
Figure 3:
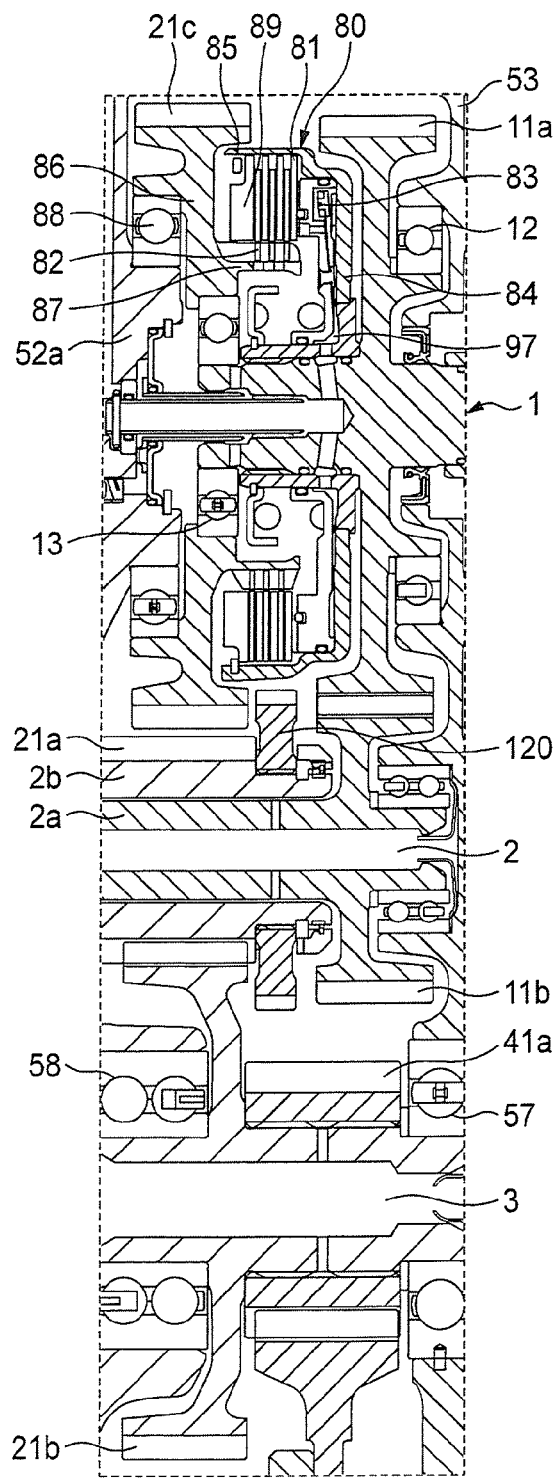
FIG. 3 is an enlarged view of a portion indicated by "A" in FIG. 2.
Figure 4:
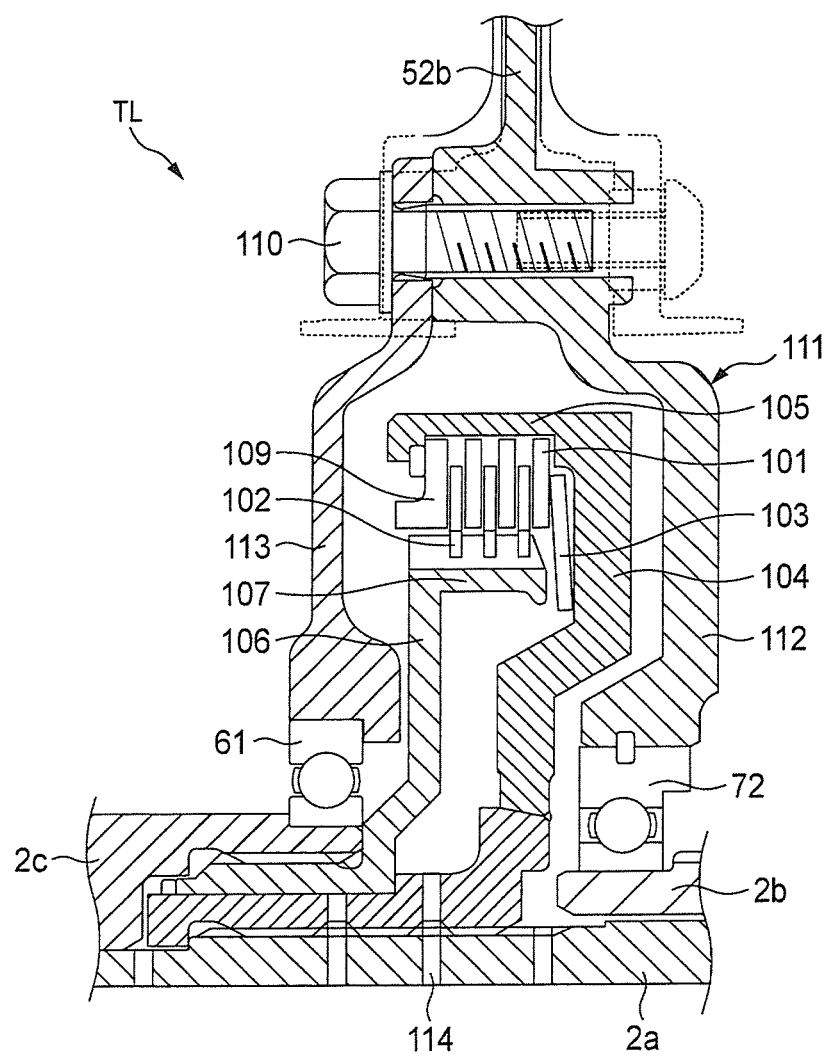
FIG. 4 is an enlarged view of a torque limiter in FIG. 2.

FIG. 1 is a skeleton diagram of a drive apparatus of a hybrid vehicle according to the present invention, FIG. 2 is a sectional view of the drive apparatus of the hybrid vehicle according to the present invention, FIG. 3 is an enlarged view of a portion indicated by "A" in FIG. 2, and FIG. 4 is an enlarged view of a torque limiter in FIG. 2.

As shown in FIG. 1, a drive apparatus 100A for a hybrid vehicle of the present embodiment includes an engine 50, a generator 60, a motor 70, and a transmission 90. The transmission 90 includes an engine shaft 1, a motor-generator shaft 2 and an output shaft 3, which are arranged in parallel to each other. Further, the motor-generator shaft 2 includes an inner shaft 2a connected to the engine shaft 1 via a generator driving gear train 10 so that the inner shaft rotates interlockingly with the engine shaft 1, that is, the power transmission relationship between the engine shaft and the inner shaft is not separated, a hollow outer shaft 2b for the motor disposed around the inner shaft 2a and connected to the motor 70 and a generator shaft 2c connected to the generator 60. The inner shaft 2a is connected to the engine shaft 1 via the generator driving gear train 10 and further connected to the generator shaft 2c via a torque limiter TL. The outer shaft 2b for the motor is connected to the output shaft 3 via a motor power transmission gear train 20. Further, the engine shaft 1 is connected to the output shaft 3 via an engine power transmission gear train 30 and a clutch 80 for connecting or separating the power transmission between the engine shaft 1 and the output shaft 3 is provided on the engine shaft 1.

The output shaft 3 is connected to a differential device 45 for transmitting power to diving wheels 47, 47 via a final gear train 40, so that the power of the engine 50, the motor 70 and the generator 70 can be transmitted to the driving wheels 47, 47.

The drive apparatus 100A for the hybrid vehicle of the present invention including such elements as main components includes a transmission path for transmitting the power of the motor 70 to the driving wheels 47, 47 to drive the vehicle and a transmission path for transmitting the power of the engine 50 to the driving wheels 47, 47 to drive the vehicle. Either or both of these two transmission paths can be used to drive the vehicle.

By referring to FIG. 1, the transmission paths for transmitting the power of the motor 70 and the engine 50 to the driving wheels 47, 47 to drive the vehicle are described.

The transmission path for transmitting the power of the motor 70 to the driving wheels 47, 47 is a transmission path in which the power of the motor 70 is transmitted to the driving wheels 47, 47 via the outer shaft 2b for the motor→the motor power transmission gear train 20→the output shaft 3→the differential device 45.

The transmission path for transmitting the power of the engine 50 to the driving wheels 47, 47 is a transmission path in which the power is transmitted to the driving wheels 47, 47 via the engine shaft 1→the clutch 80→the engine power transmission gear train 30→the output shaft 3→the differential device 45. In order to establish this transmission path, it is required to connect the clutch 80.

In addition to these two transmission paths, a transmission path connecting the engine 50 and the generator 60, that is, a transmission path leading to the generator 60 from the engine shaft 1 via the generator driving gear train 10→the inner shaft 2a→the torque limiter TL→the generator shaft 2c is established in the transmission 90. Accordingly, the so-called series-drive is realized by driving the engine 50 to operate the generator 60 during travel through the above-described transmission path for transmitting the power of the motor 70 to the driving wheels 47, 47 and supplying the generated electric power to the motor 70.

Further, when the engine 50 in a stop state is started, the generator 60 is driven and therefore the engine 50 can be cranked and started by the power of the generator 60.

Since the torque limiter TL is provided on the transmission path connecting the engine 50 and the generator 60, more specifically, on the transmission path between the inner shaft 2a and the generator shaft 2c and power is transmitted therebetween via the torque limiter TL, the torque is adjusted to a value smaller than a predetermined value by the action of the torque limiter TL when excessive torque larger than the predetermined value is transmitted to the torque limiter TL.

Further, in the drive apparatus 100A for the hybrid vehicle, the so-called parallel-drive becomes possible that the power of engine 50 and the power of the motor 70 are combined by further driving the motor 70 while the engine is driven via the transmission path for transmitting the power of the engine 50 to the driving wheels 47, 47.

Next, a structure of the drive apparatus 100A for the hybrid vehicle of the present invention will be described in detail with reference to FIGS. 2 to 4.

The drive apparatus 100A for the hybrid vehicle of the present invention includes a case 52 which consists of a first case 52a, a second case 52b and a third case 52c from the engine 50 side (right side in the drawings). The first case 52a is fixed to a damper housing 53 for accommodating a damper 56 and the first, second and third cases 52a, 52b and 52c are fixed to each other by a plurality of bolts 54. Further, the engine shaft 1, the motor-generator shaft 2 and the output shaft 3 are arranged parallel to each other in the case 52.

The engine shaft 1 is disposed coaxially with a crankshaft 51 of the engine 50. An engine 50 side of the engine shaft is supported on the damper housing 53 by a bearing 12 and a side of the engine shaft opposite to the engine 50 is supported on the first case 52a by bearings 13, 88. Power of the crankshaft 51 is transmitted to the engine shaft 1 via a drive plate 55 and the damper 56. An output gear 11a to configure the generator driving gear train 10 is provided at an axial center portion of the engine shaft 1 and the clutch 80 is provided at a side of the output gear 11a opposite to the engine 50.

The clutch 80 is a so-called multiple disc clutch and includes a plurality of disc-shaped clutch discs 81, a plurality of disc-shaped clutch plates 82 and a clutch piston 83 which urges the clutch discs 81 and the clutch plates 82. The plurality of clutch discs 81 are movable in an axial direction and an outer periphery thereof is held on a cylindrical outer diameter hub 85 provided in an outer edge of a first clutch holding member 84. Further, the plurality of clutch plates 82 are movable in an axial direction and an inner periphery thereof is held on a cylindrical inner diameter hub 87 formed in a second clutch holding member 86. And, the clutch discs 81 and the clutch plates 82 are alternately superimposed while being parallel to each other and spaced apart in an axial direction. And, an actuation chamber 97 connected to a hydraulic circuit (not shown) is formed between the clutch piston 83 and the first clutch holding member 84.

An output gear 21c to configure the engine power transmission gear train 30 is integrally formed to an outer peripheral edge of the second clutch holding member 86. Further, the second clutch holding member 86 is supported to the first case 52a in an inner peripheral surface of a base part thereof by the bearing 88.

Accordingly, when the pressure in the actuation chamber 97 is released and reduced to a predetermined value by the hydraulic control, the clutch piston 83 is moved toward the engine 50. Thereby, the clutch disc 81 and the clutch plate 82 adjacent to each other are spaced apart and thus the clutch 80 is cut-off. At this time, the power of the engine shaft 1 is not transmitted to the engine power transmission gear train 30 via the clutch 80.

Meanwhile, when the pressure in the actuation chamber 97 is increased and thus becomes to be larger than a predetermined value, the clutch piston 83 is moved in a direction opposite to the engine 50. Accordingly, the clutch discs 81 and the clutch plates 82 are sandwiched between the clutch piston 83 and a stopper 89 fixed to the outer diameter hub 85.

Thereby, the clutch disc 81 and the clutch plate 82 adjacent to each other are frictionally engaged with each other, so that the clutch 80 is connected and the second clutch holding member 86 is directly connected to the engine shaft 1, thereby being locked up. At this time, since the output gear 21*c* to configure the engine power transmission gear train 30 is integrally formed to the second clutch holding member 86, the power of the engine shaft 1 is transmitted to the output shaft 3 via the engine power transmission gear train 30 by the clutch 80.

The motor 70 includes a rotor 74 which has an inner peripheral end fixed to the outer shaft 2*b* for the motor and a stator 75 which is fixed to the first case 52*a* and disposed to face the rotor 74. The stator 75 includes a stator core 76 and a coil 77 wound around the stator core 76 by a distributed winding.

The generator 60 includes a rotor 64 which has an inner peripheral end fixed to the generator shaft 2*c* and a stator 65 which is fixed to the second case 52*b* and disposed to face the rotor 64. The stator 65 includes a stator core 66 and a coil 67 wound around the stator core 66 by a distributed winding.

The motor-generator shaft 2 includes the inner shaft 2*a*, the outer shaft 2*b* for the motor disposed around the inner shaft 2*a* on the engine 50 side and the generator shaft 2*c* disposed around at least a portion of the inner shaft 2*a*.

More specifically, an input gear 11*b* is formed at an end of the inner shaft 2*a* on the side of the engine 5. The input gear 11*b* is engaged with the output gear 11*a* of the generator driving gear train 10 of the engine shaft 1 and has fewer teeth than the output gear 11*a*. Accordingly, the rotation of the engine shaft 1 is speeded-up and transmitted to the inner shaft 2*a*. Further, the torque limiter TL is provided between the motor 70 and the generator 60 in an end of the inner shaft 2*a* opposite to the engine 50 in such a way that the torque limiter is axially overlapped with the coil 77 of the stator 75 of the motor 70 and the coil 67 of the stator 65 of the generator 60. The torque limiter TL is not limited to this configuration and may be axially overlapped with at least a portion of the coil 77 of the stator 75 of the motor 70 or the coil 67 of the stator 65 of the generator 60.

The outer shaft 2*b* for the motor has a dual structure and is integrally rotatably mounted to the motor 70. An output gear 21*a* to configure the motor power transmission gear train 20 is provided at an end of the outer shaft 2*b* on the side of the engine 50. Further, the outer shaft 2*b* for the motor is supported on the first case 52*a* by a bearing 77 disposed between the motor 70 and the output gear 21*a* and an end of the outer shaft opposite to the engine 50 is supported on a first wall part 112 of a torque limiter accommodating chamber 111 formed in the second case 52*b* by a bearing 72. Further, in a region between the bearing 71 and the motor 70, a resolver 73 for detecting a rotation angle of the outer shaft 2*b* for the motor is attached to the outer shaft 2*b* for the motor. Reference numeral 120 in FIG. 2 refers to a parking gear.

The generator shaft 2*c* is integrally rotatably mounted to the generator 60. An end of the generator shaft 2*c* on the side of the engine 50 is supported on a second wall part 113 of the torque limiter accommodating chamber 111 formed in the second case 52*b* by a bearing 61 and an end of the generator shaft 2*c* opposite to the engine 50 is supported on the third case 52*c* by a bearing 62. Further, in a region between the bearing 62 and the generator 60, a resolver 63 for detecting a rotation angle of the generator shaft 2*c* is attached to the generator shaft 2*c*.

As shown in FIG. 4, the torque limiter TL includes a first torque limiter holding member 104 which is splined to the inner shaft 2*a* to rotate integrally, a second torque limiter holding member 106 which is splined to the generator shaft 2*c* to rotate integrally, a plurality of disc-shaped plates 101, a plurality of disc-shaped discs 102, a disc spring 103 which urges the plates 101 and the discs 102, and an end plate 109 which is fixed to the first torque limiter holding member 104. The torque limiter TL is accommodated in the torque limiter accommodating chamber 111 which is formed by fastening the second wall part 113 to the first wall part 112 formed at the second case 52*b* by a bolt 110.

The plurality of plates 101 are movable in an axial direction and an outer periphery thereof is held on a cylindrical outer diameter hub 105 provided in an outer edge of the first torque limiter holding member 104. The plurality of discs 102 are movable in an axial direction and an inner periphery thereof is held on a cylindrical inner diameter hub 107 provided in an outer edge of the second torque limiter holding member 106. And, the plurality of plates 101 and discs 102 are alternately superimposed while being parallel to each other and spaced apart in an axial direction.

The disc spring 103 urges the plates 101 and the discs 102 by its urging force to move them toward a side opposite to the engine 50, so that the plates 101 and the discs 102 are sandwiched between the disc spring 103 and the end plate 109 fixed to the outer diameter hub 105. Thereby, the plates 101 and the discs 102 adjacent to each other are frictionally engaged.

In the torque limiter TL thus configured, when rotation torque transmitted from the generator 60 via the generator shaft 2*c* at the time of starting the engine is smaller than a predetermined value, a frictional force between the plates 101 and the discs 102 is stronger than the rotation torque. Accordingly, the plate 101 and the discs 102 are completely engaged and locked up, so that the generator shaft 2*c* and the inner shaft 2*a* are directly connected (engagement state). And, the rotation torque can be transmitted from the inner shaft 2*a* to the engine shaft 1 via the generator driving gear train 10 and rotate the crankshaft 51 via the damper 56, thereby starting the engine 50.

On the contrary, when excessive torque is inputted from the generator 60 via the generator shaft 2*c* at the time of starting the engine and therefore the rotation torque of the generator shaft 2*c* reaches the predetermined value, the rotation torque overcomes the frictional force between the plates 101 and the discs 102 so that the plates 101 and the discs 102 are slidingly engaged (operation state). Accordingly, the rotation torque equal to or greater than the predetermined value is not transmitted between the first torque limiter holding member 104 and the second torque limiter holding member 106. As a result, the rotation torque transmitted to the engine shaft 1 via the inner shaft 2*a* is restricted to a value equal to or less than the predetermined value.

In this way, since the torque limiter TL is arranged on the power transmission path between the generator 60 and the inner shaft 2*a* of the motor-generator shaft 2 configured so as to be speeded-up relative to the engine shaft 1, the torque is reduced, as compared to a case where the torque limiter is arranged in the crankshaft 51 of the engine 50. This can be similarly applied to a case where the power of the engine 50 is transmitted to the generator 60, similar to when the engine is started. Accordingly, it is possible to reduce the capacity of the torque limiter TL and also to reduce the space for installation.

The inner shaft 2*a* is not limited to the configuration that the inner shaft is necessarily speeded up relative to the engine shaft 1. That is, a gear ratio of the output gear 11*a* and the input gear 11*b* of the generator driving gear train 10 may be set such that a predetermined output power is transmitted to the inner shaft 2*a*. For example, the inner shaft 2*a* may be configured such that the inner shaft is decelerated relative to the engine shaft 1 by increasing the number of teeth of the input gear 11b with respect to the output gear 11a.

Further, a plurality of input gears 11b may be provided such that the gear ratio is appropriately changed depending on the driver or running conditions.

Further, since the torque limiter TL is arranged between the motor 70 and the generator 60, it is possible to shorten the axial distance from the torque limiter TL to the generator 60 and to increase the torsional natural vibration frequency of the transmission 90. Accordingly, it is possible to suppress the occurrence of the resonance phenomenon due to the matching of the torsional natural vibration frequency of the transmission 90 and the engine torque fluctuation frequency. In addition, it is possible to prevent excessive torque from being inputted to the motor-generator shaft 2 or the like by the torque limiter TL, even if the resonance phenomenon occurs.

Further, since the toque limiter TL is arranged so as to be overlapped with the coil 77 of the stator 75 of the motor 70 and the coil 67 of the stator 65 of the generator 60 in an axial direction, it is possible to improve the space efficiency of the torque limiter TL.

In addition, since the coil 67 of the stator 65 of the generator 60 and the coil 77 of the stator 75 of the motor 70 are formed by a distributed winding, an axial size thereof becomes larger, as compared to a case of being formed by a salient-pole concentrated winding. Accordingly, when the generator 60 and the motor 70 are arranged in parallel on the same axis as in the present embodiment, an axial dead space is formed between the generator 60 and the motor 70. In this way, it is possible to easily arrange the torque limiter TL by utilizing the dead space.

Further, since the coil 67 of the stator 65 of the generator 60 and the coil 77 of the stator 75 of the motor 70 are formed by a distributed winding, more magnetic pole fibers can be wound and thus it is possible to increase the torque, as compared to the case of being formed by a salient-pole concentrated winding.

Further, the inner shaft 2a is provided with an oil passage 114 for the torque limiter, which extends in a diametrical direction and communicates with the torque limiter TL. Thereby, oil is supplied to the torque limiter TL in the torque limiter accommodating chamber 111 and thus the torque limiter TL is configured in a wet type. Accordingly, it is possible to suppress the temperature rise due to the sliding when the plates 101 and the discs 102 of the torque limiter TL are slidingly engaged (operation state).

Figure 5:
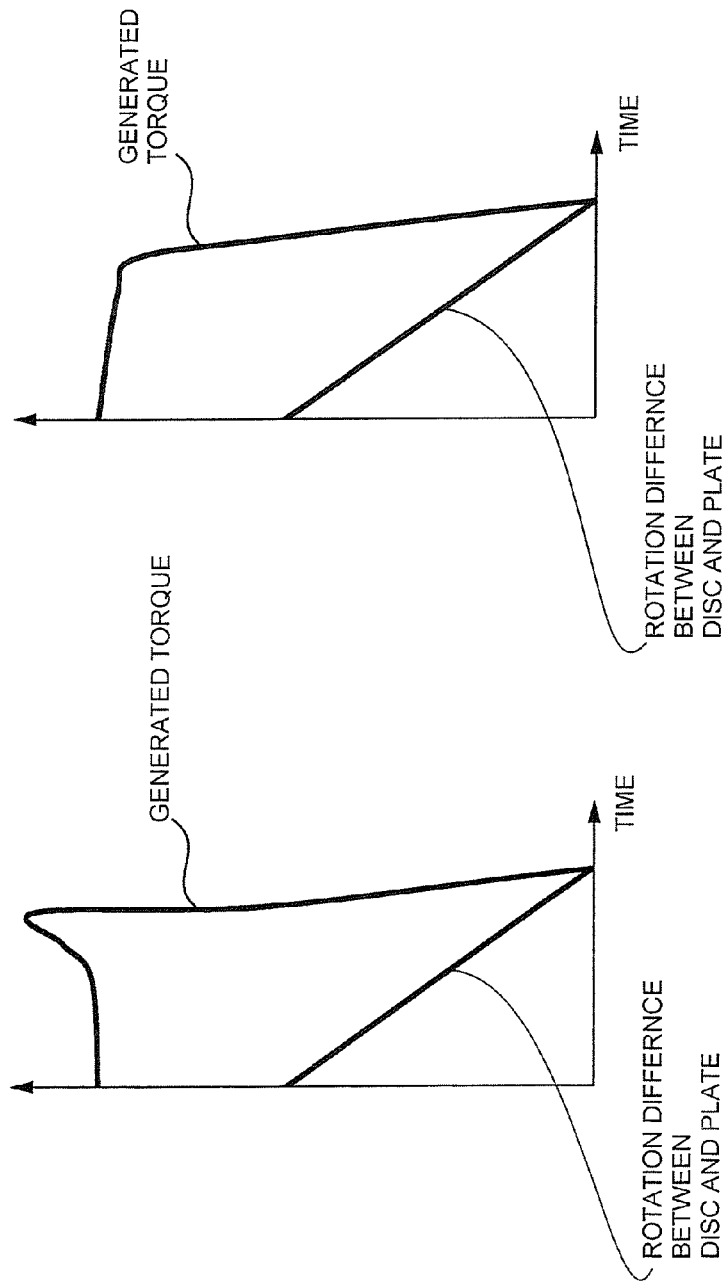
FIGS. 5(a) and 5(b) are views for explaining the torque generated when the torque limiter is migrated from an operation state to an engagement state, FIG. 5 (a) shows a dry torque limiter, and FIG. 5 (b) shows a wet torque limiter.

Furthermore, unlike the case (FIG. 5 (*a*)) where the torque limiter TL is configured in a dry type, in a case where the torque limiter TL is configured in a wet type as shown in FIG. 5 (*b*), it is possible to prevent the occurrence of excessive torque by μ-V properties of the oil when the plates 101 and the discs 102 are migrated from a slidingly engaged state (operation state) to a completely engaged state (engagement state). Although it is desirable that the torque limiter TL is configured as a wet-type torque limiter, the torque limiter may be configured as a dry-type torque limiter.

Further, by referring back to FIG. 2, the second wall part 113 of the torque limiter accommodating chamber 111 for the torque limiter TL is provided at its vertically lower part (lower side in the drawing) with an oil passage 115 for the generator, which is communicated with the generator 60. Accordingly, the oil supplied into the torque limiter accommodating chamber 111 is further supplied to the generator 60 and therefore the generator 60 can be cooled by the oil.

Particularly, since the oil passage 115 for the generator is provided at the vertically lower part of the second wall part 113, the oil can be effectively supplied to the generator 60 by gravity, thereby further increasing the cooling efficiency.

Although the oil passage 115 for the generator is provided at the vertically lower part of the second wall part 113 in the present embodiment, the present invention is not limited to this configuration. An oil passage for the motor communicated with the motor 70 may be provided at a vertically lower part of the first wall part 112 or these oils passages may be provided at the vertically lower parts of both wall parts 112, 113, respectively.

In sequence from the engine 50 side, the output shaft 3 is engaged with an output gear 41a to configure the final gear train 40, the output gear 21c of the engine shaft 1 and the output gear 21a of the outer shaft 2b for the motor and is adapted to configure the motor power transmission gear train 20 together with the engine power transmission gear train 30. An end of the output shaft 3 on the side of the engine 50 is supported on the damper housing 53 by a bearing 57 and an end of the output shaft opposite to the engine 50 is supported on the first case 52a by a bearing 58.

An end of the differential device 45 on the side of the engine 50 is supported on the damper housing 53 by a bearing 59a and an end of the differential device opposite to the engine 50 is supported on the first case 52a by a bearing 59b. The differential device 45 includes an input gear 41b to configure the final gear train 40 and is engaged with the output gear 41a of the output shaft 3, so that the power of the motor 70 inputted to the output shaft 3 and/or the power of the engine 50 is transmitted to a differential gear shaft 46 and transmitted to the driving wheels 47, 47 via the differential gear shaft 46.

Further, the drive apparatus 100A for the hybrid vehicle according to one embodiment of the present invention includes a transmission path for transmitting the power of the motor 70 to the driving wheels 47, 47 to drive the vehicle and a transmission path for transmitting the power of the engine 50 to the driving wheels 47, 47 to drive the vehicle. Either or both of these two transmission paths can be used to drive the vehicle. However, the drive apparatus of the hybrid vehicle of the present invention is not limited to the above-described embodiments, but may be appropriately changed and modified. For example, the present invention may be applied to a drive apparatus of a hybrid vehicle in which only a so-called series-drive is possible.

According to an embodiment, a drive apparatus of a hybrid vehicle (for example, a drive apparatus of a hybrid vehicle 100A) includes an engine (for example, an engine 50), a first shaft (for example, an engine shaft 1) disposed coaxially with an output shaft (for example, a crankshaft 51) of the engine and configured to transmit the power of the engine, a second shaft (for example, a motor-generator shaft 2) disposed parallel to the first shaft and including an inner shaft (for example, an inner shaft 2a) which is connected to rotate interlockingly with the first shaft and an outer shaft (for example, an outer shaft 2b for a motor) which is rotatably disposed relative to the inner shaft around the inner shaft, a first electromotor (for example, a generator 60) connected to the inner shaft such that power can be transmitted, and a second electromotor (for example, a motor 70) disposed on the same axis as the first electromotor and connected to the outer shaft such that power can be transmitted A torque limiter mechanism (for example, a torque limiter TL) is provided between the first electromotor and the second electromotor on a power transmission path between the inner shaft and the first electromotor.

The torque limiter mechanism is overlapped with at least a portion of a stator (for example, a stator 65) of the first electromotor and/or a stator (for example, a stator 75) of the second electromotor in an axial direction.

Since the toque limiter mechanism is provided between the first electromotor and the second electromotor so as to be overlapped with at least a portion of the stator of the first electromotor and/or the stator of the second electromotor in an axial direction, it is possible to shorten an axial distance from the torque limiter mechanism to the first electromotor and thus it is possible to reduce the space occupied by the torque limiter mechanism. Further, the torsional natural vibration frequency of the apparatus can be increased and therefore it is possible to suppress the occurrence of the resonance phenomenon due to the matching of the torsional natural vibration frequency of the apparatus and the engine torque fluctuation frequency. In addition, it is possible to prevent excessive torque from being inputted to the motor-generator shaft or the like by the torque limiter mechanism, even if the resonance phenomenon occurs.

According to an embodiment, the first shaft is connected to the inner shaft via a transmission mechanism (for example, a generator driving gear train 10).

The transmission mechanism includes an output part (for example, an output gear 11a) provided in the first shaft and an input part (for example, an input gear 11b) provided in the inner shaft and connected to the output part.

The output part and the input part are configured such that the inner shaft is speeded-up relative to the first shaft.

Since the inner shaft is speeded-up relative to the first shaft and the torque limiter mechanism is provided on the power transmission path between the inner shaft and the first electromotor, the torque applied to the torque limiter mechanism is decreased, so that the capacity of the torque limiter mechanism can be reduced and thus the space for installation can be reduced, as compared to a case where the torque limiter mechanism is arranged in the output shaft of the engine or the first shaft.

According to an embodiment, the inner shaft is provided with a first oil passage (for example, an oil passage 114 for the torque limiter) which is communicated with the torque limiter mechanism.

Since the inner shaft is provided with the first oil passage which is communicated with the torque limiter mechanism, the torque limiter mechanism is configured in a wet type. Accordingly, it is possible to suppress the temperature rise due to the sliding of the torque limiter mechanism when the torque limiter mechanism is operated. Furthermore, it is possible to suppress the occurrence of excessive torque at the time of being migrated from an operation state to an engagement state.

According to an embodiment, the torque limiter mechanism is disposed in a torque limiter accommodating chamber (for example, a torque limiter accommodating chamber 111) which is provided in a case (for example, a case 52).

The torque limiter accommodating chamber is provided at its vertically lower part with a second oil passage (for example, an oil passage 115 for the generator or an oil passage for the motor) which is communicated with at least one of the first electromotor and the second electromotor.

Since the torque limiter mechanism is provided at its vertically lower part with the second oil passage which is communicated with at least one of the first electromotor and the second electromotor, it is possible to cool the first and/or second electromotor by the oil discharged from the torque limiter mechanism. Particularly, since the second oil passage is provided at the vertically lower part of the torque limiter mechanism, the oil can be effectively supplied to the first and/or second electromotor by gravity, thereby further increasing the cooling efficiency.

This application is based on Japanese Patent Application No. 2010-236813 filed on Oct. 21, 2010 and the entire contents of which are incorporated herein by reference.

DESCRIPTION OF REFERENCE NUMERALS

1 ENGINE SHAFT (FIRST SHAFT)
2 MOTOR-GENERATOR SHAFT (SECOND SHAFT)
2a INNER SHAFT
2b OUTER SHAFT FOR MOTOR (OUTER SHAFT)
10 GENERATOR DRIVING GEAR TRAIN (TRANSMISSION MECHANISM)
11a OUTPUT GEAR (OUTPUT PART)
11b INPUT GEAR (INPUT PART)
50 ENGINE
51 CRANKSHAFT (OUTPUT SHAFT OF ENGINE)
52 CASE
60 GENERATOR (FIRST ELECTROMOTOR)
65 STATOR
70 MOTOR (SECOND ELECTROMOTOR)
75 STATOR
100A DRIVE APPARATUS FOR HYBRID VEHICLE
111 TORQUE LIMITER ACCOMMODATING CHAMBER
114 OIL PASSAGE FOR TORQUE LIMITER (FIRST OIL PASSAGE)
115 OIL PASSAGE FOR GENERATOR (SECOND OIL PASSAGE)
TL TORQUE LIMITER (TORQUE LIMITER MECHANISM)

The invention claimed is:

1. A drive apparatus of a hybrid vehicle comprising:
an engine;
a first shaft disposed coaxially with an output shaft of the engine and configured to transmit a power of the engine;
a second shaft disposed parallel to the first shaft and including an inner shaft which is connected to rotate interlockingly with the first shaft and an outer shaft which is disposed around the inner shaft so as to be rotatable with respect to the inner shaft;
a first electromotor connected to the inner shaft for transmitting power; and
a second electromotor disposed coaxially with the first electromotor and connected to the outer shaft for transmitting power,
wherein a torque limiter mechanism is:
provided in a power transmission path between the inner shaft and the first electromotor at a position between the first electromotor and the second electromotor,
overlapped in an axial direction with at least a portion of a stator of the first electromotor and/or a stator of the second electromotor, and
disposed in a torque limiter accommodating chamber which is provided in a case and into which oil is supplied,
wherein the torque limiter accommodating chamber includes a first oil passage which is communicated with the first electromotor and a second oil passage which is communicated with the second electromotor at a vertically lower part of the torque limiter accommodating chamber.

2. The drive apparatus of the hybrid vehicle according to claim 1,
wherein the first shaft is connected to the inner shaft via a transmission mechanism, wherein the transmission mechanism includes an output part provided on the first shaft and an input part provided on the inner shaft and connected to the output part, and wherein the output part and the input part are configured such that the inner shaft is speeded-up with respect to the first shaft.

3. The drive apparatus of the hybrid vehicle according to claim 2, wherein the inner shaft is provided with a third oil passage which is communicated with the torque limiter mechanism.

* * * * *